(12) United States Patent
Crist

(10) Patent No.: US 7,658,127 B2
(45) Date of Patent: Feb. 9, 2010

(54) SINGLE INERTIA BENDING DAMPER

(75) Inventor: Robert J. Crist, Greene County, MO (US)

(73) Assignee: Dayco Products, LLC, Miamisburg, OH (US)

( * ) Notice: Subject to any disclaimer, the term of this patent is extended or adjusted under 35 U.S.C. 154(b) by 1167 days.

(21) Appl. No.: 10/802,104

(22) Filed: Mar. 16, 2004

(65) Prior Publication Data

US 2005/0204858 A1 Sep. 22, 2005

(51) Int. Cl.
*F16F 15/12* (2006.01)
*F16C 15/00* (2006.01)

(52) U.S. Cl. .................. 74/574.4; 74/572.2

(58) Field of Classification Search ............ 74/574.4, 74/572.2, 574.1; 29/451, 458; 192/48.5; F16F 15/126, F16F 15/12; F16C 15/00
See application file for complete search history.

(56) References Cited

U.S. PATENT DOCUMENTS

| | | | |
|---|---|---|---|
| 2,972,904 A | | 2/1961 | Troyer |
| 5,231,893 A | | 8/1993 | Sisco et al. |
| 5,405,296 A | | 4/1995 | Cerny et al. |
| 5,967,278 A | * | 10/1999 | Fukushima et al. ....... 192/48.5 |
| 6,089,204 A | | 7/2000 | Shaffer |
| 6,345,430 B1 | * | 2/2002 | Haga et al. ................. 29/458 |
| 7,584,685 B2 | * | 9/2009 | Crist ......................... 74/574.1 |
| 2005/0160572 A1 | * | 7/2005 | Kano ........................ 29/451 |
| 2009/0111589 A1 | * | 4/2009 | Bouzit et al. ............... 464/73 |

FOREIGN PATENT DOCUMENTS

JP 11-230269 * 8/1999

OTHER PUBLICATIONS

Harris' Shock and Vibration Handbook, Cyril M. Harris et al., Publisher McGraw-Hill, 2002, Chapter 35, Engineering Properties of Composites, Keith T. Kedward, pp. 35.1-35-31.*
Shear modulus—Wikipedia, the free encyclopedia, http://en.wikipedia.org/wiki/Shear-modulus, Feb. 2007.*
Young's modulus—Wikipedia, the free encyclopedia, http://en.wikipedia.org/wiki/Shear-modulus, Feb. 2007.*

* cited by examiner

*Primary Examiner*—Vinh T. Luong
(74) *Attorney, Agent, or Firm*—Thompson Hine, LLP; Joseph V. Tassone

(57) ABSTRACT

A vibration damper for controlling the torsional and bending vibrations in a rotating shaft is provided. The vibration damper includes a hub, an inertia element, and an elastic element that possess a first shear modulus in a first direction and a second shear modulus in a second direction. The hub is adapted to be coupled to the shaft for rotational movement. The inertia element is concentric with the hub and has a mass. The elastic element is adapted to non-rigidly couple the hub and the inertia element. The elastic element may be a non-isotropic composite material having a plurality of fibers dispersed therein.

11 Claims, 5 Drawing Sheets

SINGLE INERTIA BENDING DAMPER

TECHNICAL FIELD

The present invention relates generally to a vibration damper for a rotating shaft, and more particularly, to a single inertia damper having an elastic element that possesses a first shear modulus in a first direction and second shear modulus in a second direction.

BACKGROUND

Typically, the crankshaft of an automobile is driven (or rotated) by the reciprocating motion of the pistons of an internal combustion engine. The rotational motion of the crankshaft is then transferred to the wheels to drive the automobile. The combustion forces that are induced upon the crankshaft, and transferred through the piston-rod connection, introduce torque pulses that act to spin the crankshaft. Oftentimes the torque-pulse-excitation of the crankshaft occurs at a rate (or frequency) that corresponds with the crankshaft's first or second natural torsional frequency. If a crankshaft is left to operate in a high amplitude torsional resonance condition, the crankshaft is likely to fail much sooner than desirable. Therefore, it is typical to control a crankshaft that is operating in a resonant condition by adding a specially designed crankshaft damper. Typical crankshaft dampers include an inertial mass that is coupled to the crankshaft by an elastic element that possesses a torsional spring rate. The torsional spring rate of the elastic element is generally governed by the shear modulus of the elastic element.

In addition to torsional vibrations, dampers may also be used to manage bending vibrations that occur at the crankshaft's nose, also referred to here as the crank-nose. The bending amplitude of the crank-nose can be characterized as a vector summation of axial thrust (along the crankshaft's rotational axis) and planar loading (perpendicular to the crankshaft's rotational axis). The forcing frequency of the bending vibrations is typically firing-order driven and the bending amplitudes increase with increased engine RPM, increased cylinder pressure and/or harmonic resonance of the crank-nose. The effects of crank-nose bending can vary from no deleterious affects, to compromised front sealing, to main bearing wear, to crank-nose bending and breaking.

Although the crankshaft may experience both torsional and bending vibrations, the use of two dampers, including a first damper to control torsional vibrations and a second damper to control bending vibrations, is neither efficient, nor cost-effective. Specifically, the addition of a second inertial mass to control bending vibrations drains the engine's fuel economy and torque responsiveness away from its primary function as a power source. In addition, the use of more than one damper may increase costs. Accordingly, the use of a single inertia damper is desirable. Specifically, when a crankshaft damper is already in place to combat torsional vibrations, it is desirable to manipulatively design the existing damper, which has its own natural bending frequency, to offset the effects of crankshaft bending amplitudes as well.

One commonly recognized limitation in the design of a single inertia damper is the inherent interaction between torsional and bending damper frequency. Because the spring rate/shear rate of the elastic element in the torsional direction may govern the torsional frequency of the damper, and because the spring rate/shear rate of the elastic element in the axial direction may govern the bending frequency of the damper, if the spring rate/shear rate of the elastic element is the same in each direction, as is the case with most materials, then the torsional frequency of the damper cannot be altered independently of the bending frequency of the damper by simple material substitution. It is frequently the case, however, that the torsional frequency of the damper must be adjusted without altering the bending frequency, or vice versa. Accordingly, one single inertia damper design, which is disclosed in U.S. Pat. No. 5,231,893 ("the '893 patent"), functions by altering the geometric shape of the crankshaft-to-inertial mass joint to take advantage of the difference between the spring rate of the elastic element in shear and the spring rate of the elastic element in compression. Specifically, by altering the joint geometry the torsional spring rate may be governed by the shear rate of the elastic element while the bending spring rate may be governed by the modulus of compression of the elastic element. In this manner, altering the geometry of the damper permits independent adjustment of the bending and torsional damper frequencies.

A fundamental limitation of the single inertia damper design disclosed in the '893 patent is that the joint geometry must be redesigned in order to adjust the torsional damper frequency independently of the bending damper frequency. The need for such adjustment is not an exaggerated concern since torsional damper frequency changes are common during the course of engine development and sometimes even during mature-engine performance and use proliferation. The redesign of the joint geometry requires the additional cost and lead-time to re-tool and revalidate. Moreover, the torsional and bending frequency ranges that can be controlled by current geometry-altering dampers is limited by the range of geometric shapes that are available.

Accordingly, a new single inertia damper design is desired.

SUMMARY

In a first aspect, a vibration damper for damping the torsional and bending vibrations in a rotating shaft is provided. The vibration damper includes a hub, an inertia element, and an elastic element that possesses a first shear modulus in a first direction and at least a second shear modulus in a second direction. The hub is adapted to be coupled to the shaft for rotational movement therewith. The inertia element is typically annular and concentric with the hub. The elastic element is attached to or press fit between the hub and the inertia element to non-rigidly couple the hub and the inertia element.

In a second aspect, an elastic element for damping torsional and bending vibrations in a rotating shaft is provided for use with a vibration damper having a hub and an inertia element. The elastic element is adapted to non-rigidly couple the hub and the inertia element of the vibration damper. The elastic element is made of a composite material having a first shear modulus in a first direction for controlling torsional vibrations and a second shear modulus in a second direction for controlling bending vibrations.

In a third aspect, a method of manufacturing a vibration damper is provided. The vibration damper may be used to control and dampen the bending and torsional vibrations in a rotating shaft. In one step of the method, a hub is provided that is adapted to be coupled to the rotating shaft for rotational motion therewith. In another step an inertia element is provided that is concentric with the hub. The inertia element has a mass. An elastic element is provided that possesses a first shear modulus in a first direction and a percentage of reinforcing fibers dispersed within the elastic element in a desired orientation such that the elastic element possesses a second shear modulus in a second direction. The first shear modulus may be effective in controlling torsional vibrations of the rotating shaft. The second shear modulus may be effective in controlling the bending vibrations of the rotating shaft. In a fourth step the elastic element is attached to or compressed between the hub and the inertia element, so as to non-rigidly couple the hub and the inertia element.

The method of manufacturing may further include the steps of (a) selecting the mass and geometry of the inertia element to achieve a targeted inertia, (b) selecting a first shear modulus of the elastic element to control a desired torsional vibration frequency in the rotating shaft, and (c) selecting the orientation and percentage of reinforcing fibers in the elastic element to control and dampen a desired bending vibration frequency in the rotating shaft.

DETAILED DESCRIPTION

Figure 1:
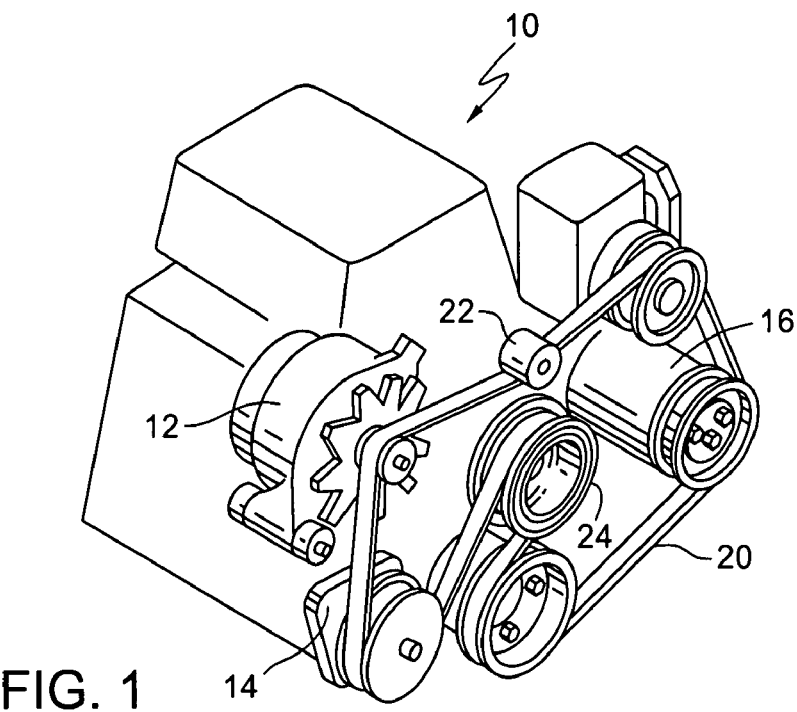
FIG. 1 is a perspective view of a typical automobile engine.

FIG. 1 is, a perspective view of a typical internal combustion engine 10 for an automobile. The engine 10 has several accessories including an alternator 12, a power steering compressor 14 and an air conditioning compressor 16. The accessories 12, 14, 16 are driven by the crankshaft 18 (shown in FIG. 3) using a power transmitting belt 20. A belt tensioner 22 may be used to avoid slippage between the belt 20 and the accessories 12, 14, 16. A vibration damper 24 may be coupled to the crankshaft 18 for rotation therewith and may engage the belt 20 for transmitting power from the crankshaft 18 to the belt 20.

The crankshaft 18 is driven by the reciprocating motion of the pistons (not shown) of the internal combustion engine 10, as is well known. The combustion forces that are induced upon the crankshaft 18 by the pistons introduce torque pulses that act to spin the crankshaft 18. Oftentimes the torque-pulse-excitation of the crankshaft 18 occurs at a rate (or frequency) that corresponds with the crankshaft's first or second natural torsional frequency. If a crankshaft is left to operate in a high amplitude torsional resonance condition, the crankshaft 18 is likely to fail much sooner than desirable.

A first end of the crankshaft 18, which is referred to here as the crank-nose, protrudes from the front of the engine 10. The other end of the crankshaft 18 is connected to the drive train of the automobile and transfers motion to the wheels of the automobile. A vibration damper 24 may be coupled to the crank-nose by any conventional means to control resonant vibrations of the crank nose.

Figure 2:
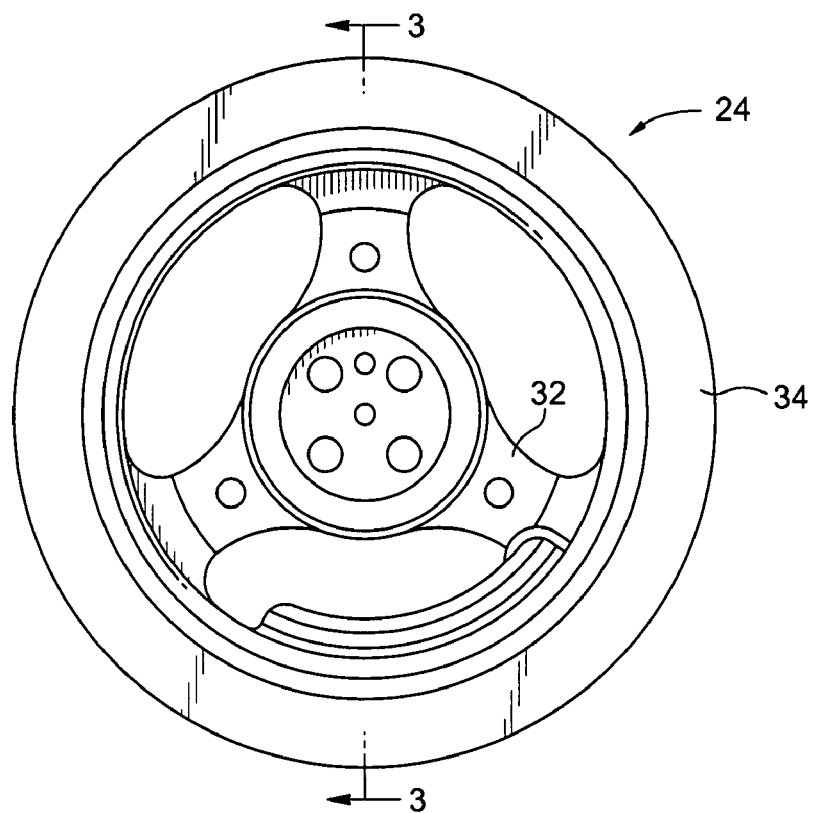
FIG. 2 is a rear view of a single inertia vibration damper according to one aspect.
Figure 3:
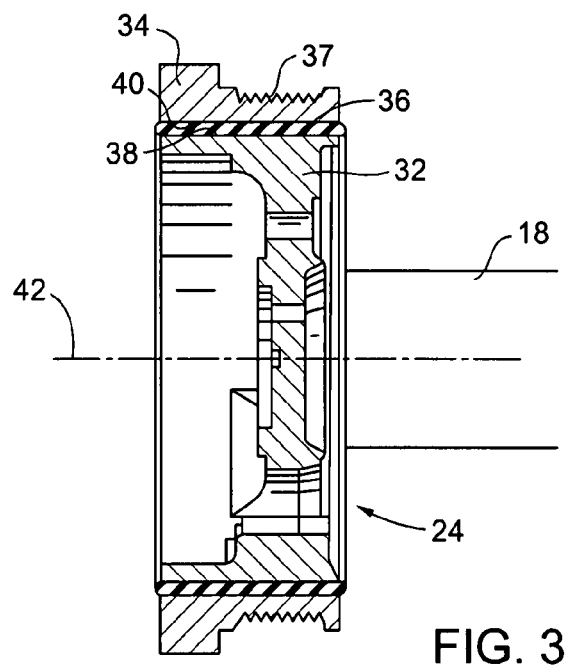
FIG. 3 is a cross-sectional view of the crankshaft and single inertia vibration damper of FIG. 2 along line 3-3.

FIGS. 2 and 3 illustrate a single inertia vibration damper 24 according to a first aspect of the invention. The vibration damper 24 may be used to dampen both torsional and bending vibrations in a rotating shaft, such as a crankshaft. More generally, however, the vibration damper 24 of the present invention may be used to control multi-directional vibrations for any rotating shaft. The vibration damper 24 includes a hub 32 that is adapted to be coupled to a shaft for rotational movement therewith, an inertia element 34 that is concentric with the hub 32, and an elastic element 36 that possess a first shear modulus in a first direction and a second shear modulus in a second direction. The hub 32 may be made from cast iron, steel, aluminum or a composite plastic. The inertia element 34 may be made from any material having sufficient mass, usually a cast iron metal.

As depicted in FIG. 3, the inertia element 34 may be concentric with and spaced radially outwardly from the hub 32. In this embodiment the hub 32 has an outer surface 38 and the inertia element 34 has an inner surface 40 that is spaced radially outwardly from the outer surface 38 of the hub 32. The elastic element 36 may be press fit between the outer surface 38 of the hub 32 and the inner surface 40 of the inertia element 34 so as to non-rigidly couple the hub 32 and the inertia element 34. The elastic element 36 may also be attached to the outer surface 38 of the hub 32 and the inner surface 40 of the inertia element 34 using a conventional adhesive typically used with other vibration damper systems. Some examples of suitable adhesives include the basic rubber bonding adhesives (solvent or aqueous) sold by Lord, Henkel or Morton. In this embodiment the power-transmitting belt 20 may be received in a groove 37 on the inertia element 34. Of course, the belt 20 may also be received in a separate pulley on the crankshaft so that the belt does not directly engage the damper 24.

Figure 10:
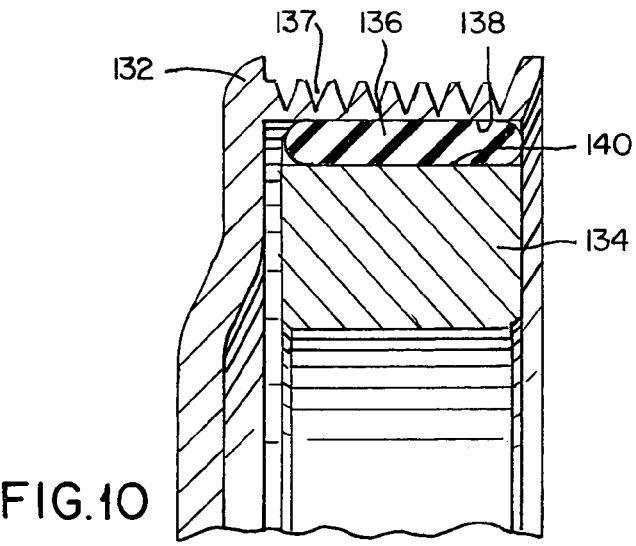
FIG. 10 is a partial cross-sectional view of a vibration damper according to another embodiment.

In another embodiment, shown in FIG. 10, the inertia element 134 may be concentric with and spaced radially inwardly from the hub 132. In this embodiment the hub 132 has an inner surface 138 and the inertia element 134 has an outer surface 140 that is spaced radially inwardly from the inner surface 138 of the hub 132. As described with respect to the embodiment shown in FIG. 3, the elastic element 136 may be press fit between the hub 132 and the inertia element 134 and may also be attached to the hub 132 and the inertia element 134 using a conventional adhesive so as to non-rigidly couple the hub 132 and the inertia element 134. In this embodiment the power-transmitting belt may be received in a groove 137 on the hub 132.

During operation, the crank-nose is subjected to a variety of complex vibrations. For the sake of clarity, however, these complex vibrations can be characterized as either torsional vibrations or bending vibrations. The vibrations of the crank-nose are transferred to the inertia element 34 through the elastic element 36, which has some "spring rate." Through selection of this spring rate the inertia element 34 is designed to vibrate out of phase with the resonant vibrations of the crank-nose resulting in a counteracting torque that controls the resonant vibrations. The "spring rate" of the elastic element 36 is governed primarily by the shear modulus of the elastic element 36. Therefore the controlling frequency characteristics of the vibration damper 24 can be adjusted by selecting the shear modulus of the elastic element 36.

Figure 4:
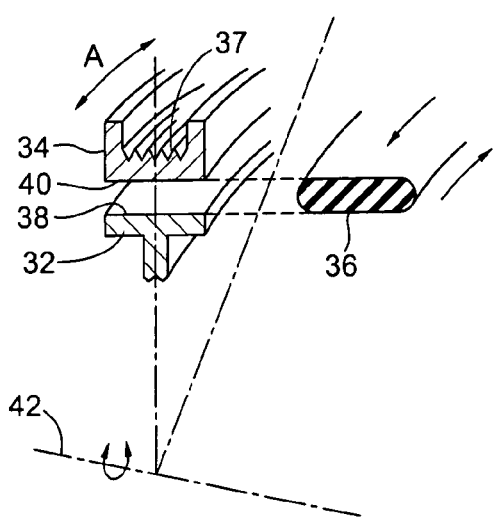
FIG. 4 is a schematic, partially exploded, partial cross-sectional view of a vibration damper, similar to the vibration damper of FIG. 3, depicting the torsional forces on an elastic element of the vibration damper.

As depicted in FIG. 4, torsional vibrations result from movement about a longitudinal axis 42 of the crankshaft 18. These torsional vibrations exert shear forces on the elastic element 36 in a first direction A as the vibrations are transferred from the hub 32 to the inertia element 34. Accordingly, the shear modulus of the elastic element 36 in the first direction A governs the spring rate of the elastic element 36 in the first direction A.

Figure 5:
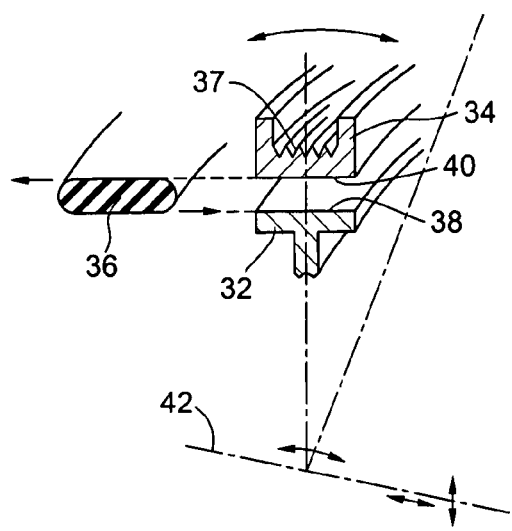
FIG. 5 is a schematic, partially exploded, partial cross-sectional view of a vibration damper, similar to the vibration damper of FIG. 3, depicting the bending forces on the elastic element of the vibration damper.

As depicted in FIG. 5, bending vibrations result from forces both along the longitudinal axis 42 of the crankshaft 18 and perpendicular to the longitudinal axis 42 of the crankshaft 18. Because the crankshaft 18 is rotating during operation, the bending vibrations produce a "pitch and yaw" motion in the crank-nose. As a result of this "pitch and yaw" motion, the bending vibrations exert primarily shear forces on the elastic element 36 in a second direction B as the bending vibrations are transferred from the hub 32 to the inertia element 34. Accordingly, the shear modulus of the elastic element 36 in the second direction B governs the spring rate of the elastic element 36 in the second direction B.

If the elastic element 36 is an isotropic material, meaning a material possessing the same physical properties in all directions, then the shear modulus of the elastic element 36 is the same in both the first direction A and the second direction B. Under these circumstances, the torsional frequency of the vibration damper 24 is directly related to the bending frequency of the vibration damper 24 and one cannot be easily modified without modifying the other. One beneficial feature of the vibration damper 24 described herein is that the torsional frequency of the vibration damper 24 can be adjusted independently of the bending frequency since a non-isotropic material is used as the elastic element 36.

The elastic element 36 may be a composite material possessing a first shear modulus in a first direction and a second effective shear modulus in a second direction. The composite material may comprise an elastomer matrix 44 having a plurality of fibers 46 dispersed therein. The matrix 44 may be made from materials such as natural rubber, nitrile butadiene rubber, ethylene propylene diene rubber, ethylene acrylic (or similar rubber sold under the name VAMAC® rubber), styrene butadiene rubber, hydrogenated nitrile butadiene rubber and polycholoroprene rubber. The fibers 46 may be continuous or fragmented (chopped) aramid fiber like the fiber sold under the name TECHNORA® fiber.

As is well known, the careful inclusion of a composited material, such as fibers 46, within a matrix 44, may restrict shear flow of the matrix material in a desired direction without restricting flow of the matrix in another direction. In this manner the shear modulus of a composite material in a second direction can be altered without affecting substantially the shear modulus of the composite material in first direction. The extent to which the shear modulus of the composite material will be altered in a particular direction is related to the percentage of the fiber dispersed within the matrix 44 and the orientation of the fibers relative to the that particular direction.

Figure 6:
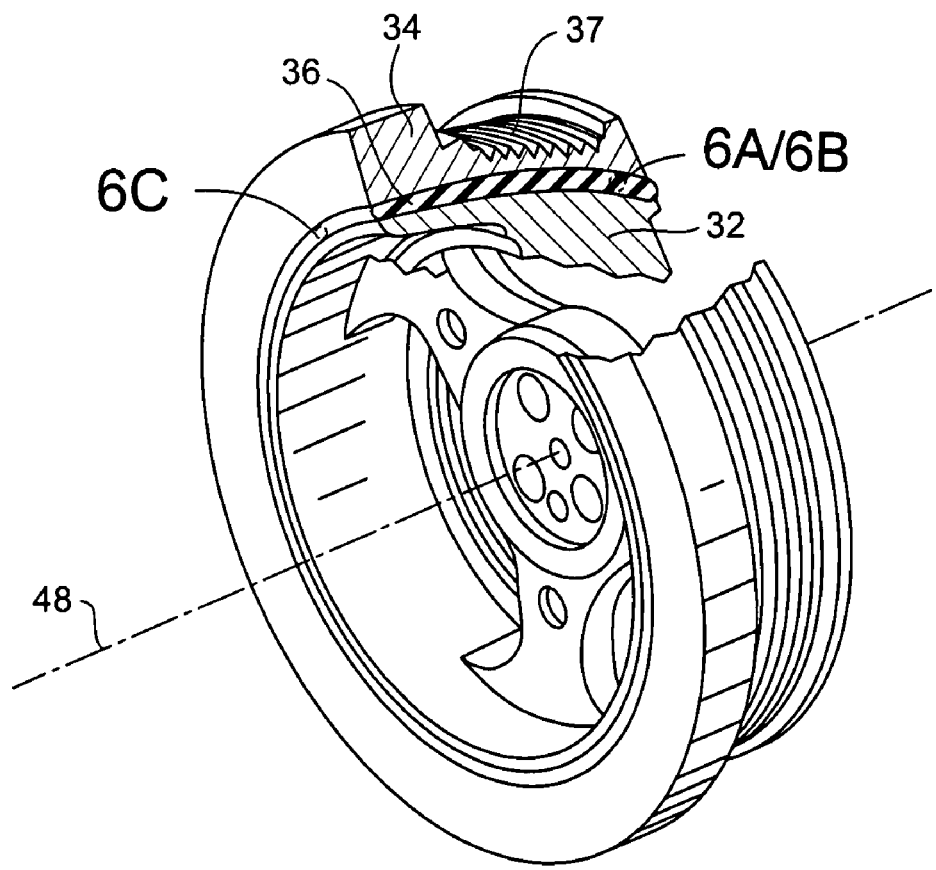
FIG. 6 is partially cut-away perspective view of the vibration damper of FIG. 2.
Figure 6A:
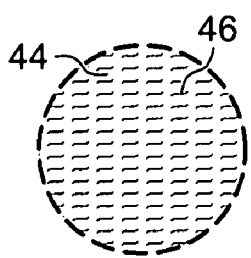
FIGS. 6A-6C depict possible alternative fiber orientations within the matrix of the elastic element of FIG. 6 at dashed circles 6A 16B and 6C.
Figure 6B:
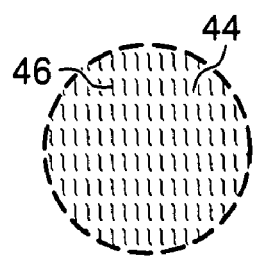
Figure 6C:
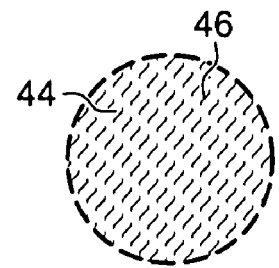

In several possible embodiments of the elastic element 36, the fibers 46 may be dispersed in a generally unidirectional orientation within the elastomer matrix 44. For example, the fibers 46 may be dispersed transversely in the matrix 44 in an axial orientation that is generally parallel to an axis of rotation 48 of the elastic element 36, as shown in FIG. 6A. The axis of rotation 48 of the elastic element 36 is coaxial with the longitudinal axis 42 of the crankshaft 18. In another possible embodiment, the fibers 46 may be dispersed longitudinally within the matrix 44 in the circumferential direction of the elastic element 36, as shown in FIG. 6C. Of course, as one skilled in the art might contemplate, other fiber orientations might be used as well. For example the fibers 46 might be disposed in a radial orientation that is generally perpendicular to the axis of rotation 48 of the elastic element 24 so that the fibers 46 extend radially from the axis of rotation 48 as shown in FIG. 6B. In addition, other fiber orientations may be used as well, including multi-directional orientations. For example, a fiber weave mat might be used in the place of a plurality of unassociated unidirectional fibers.

Figure 7:
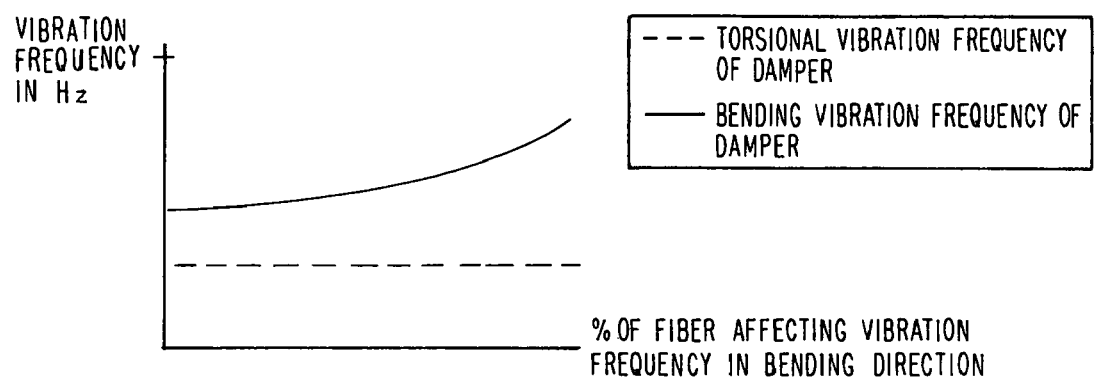
FIG. 7 depicts the anticipated independence between the torsional and bending frequencies of the vibration damper as a result of varying the fiber content of the elastic element when the fibers are dispersed in a first orientation.
Figure 8:
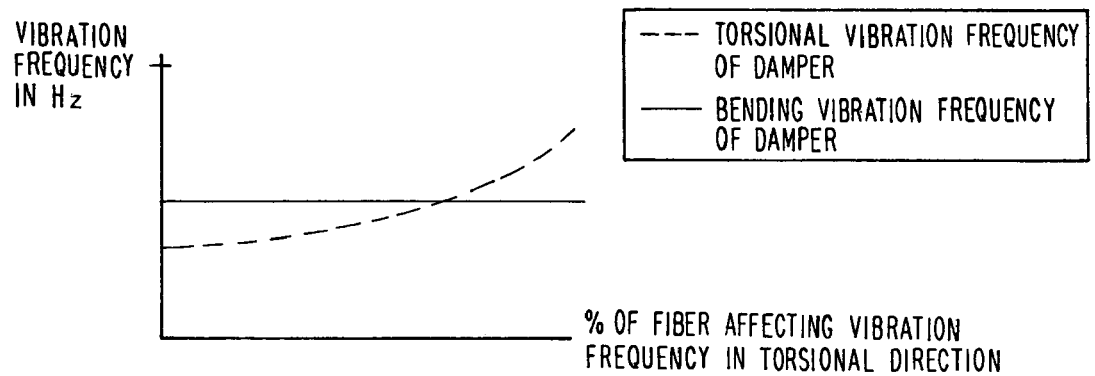
FIG. 8 depicts the anticipated independence between the torsional and bending frequencies of the vibration damper as a result of varying the fiber content of the elastic element when the fibers are dispersed in a second orientation.

FIGS. 7 and 8 depict the anticipated independence between the torsional and bending frequencies of the vibration damper 24 as influenced by the careful inclusion of fibers in a first and second orientation. Referring to FIG. 7, using a first fiber orientation the bending frequency of the vibration damper 24 can be adjusted by increasing the fiber content without adjusting the torsional frequency of the vibration damper 24. Referring to FIG. 8, using a second fiber orientation the torsional frequency of the vibration damper 24 can be adjusted by increasing the fiber content without adjusting the bending frequency of the vibration damper 24. Accordingly, the desired torsional and bending frequencies of the vibration damper 24 may be selected independently for maximum vibration control.

Figure 9:
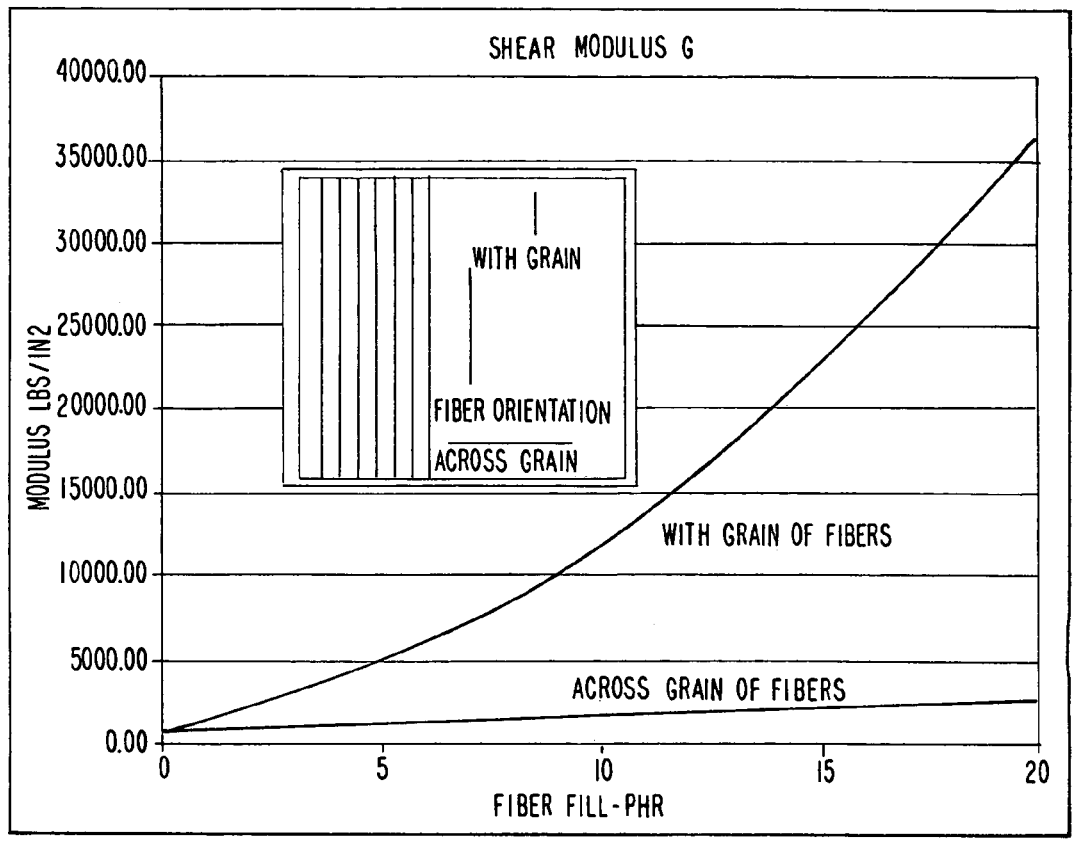
FIG. 9 depicts the anticipated effect on the shear modulus of the elastic element both in the direction of the fiber orientation and perpendicular to the direction of the fiber orientation as the percentage of fiber content is varied.

FIG. 9 shows the anticipated effect on the shear modulus of the elastic element 36, both in the direction of the embedded fibers (i.e., "with the grain") and perpendicular to the direction of the embedded fibers (i.e., "across the grain"), as the fiber content is increased. While the "with the grain" shear modulus increases substantially as the fiber content is increased, the "across the grain" shear modulus remains relatively unchanged. This physical property of the elastic element allows, for example, the torsional frequency of the vibration damper to be tuned without substantially changing the bending frequency of the vibration damper.

In the embodiment shown in FIG. 3, the outer surface 38 of the hub 32 and the inner surface 40 of the inertia element 34 are linear in the axial direction and parallel to one another. Accordingly, the elastic element depicted in FIG. 3 resembles a hollow right circular cylinder having no top or bottom and a uniform wall thickness. In other embodiments, which are not shown, the outer surface 38 of the hub 32 and the inner surface 40 of the inertia element 34 may be nonlinear in the axial direction. For example, the outer surface 38 of the hub 32 and the inner surface 40 of the inertia element 34 may have some curvature in the axial direction as shown in FIGS. 2-4 of U.S. Pat. No. 2,972,904 to Troyer. Similarly, the inverse curvature of that shown in the Troyer patent may be utilized as well. As taught by the Troyer patent, the geometry of the elastic element may also be selected to control and dampen a desired bending frequency.

In another aspect of the present invention, a method of constructing a vibration damper to control bending and torsional vibrations in a rotating shaft is provided. The steps of the method include providing a hub, an inertia element and an elastic element. The hub is adapted to be coupled to the rotating shaft for rotational movement therewith. The inertia element is concentric with the hub and possesses a mass. The elastic element possesses a first shear modulus in a first direction and a percentage of fibers dispersed within the elastic element in a desired orientation such that the elastic element possesses a second shear modulus in a second direction. In another step of the method the inertia element and the hub are operatively coupled together through the elastic element. For example, the elastic element may be attached to the outer surface of the hub and the inner surface of the inertia element so as to non-rigidly couple the hub and the inertia element. The elastic element may be attached by compressive insertion between the hub and the inertia element or by using any adhesive suitable for use in similar vibration damper systems.

The resonant frequency of the torsional vibrations of the rotating shaft may be known or experimentally determined. To effectively control the resonant torsional vibrations in the rotating shaft the method may include the additional steps of selecting the mass and geometry of the inertia element and selecting the first shear modulus of the elastic element. This process of selecting a mass and a spring rate to control torsional vibrations is well known in the art. Once the torsional vibrations have been sufficiently controlled, the method may include the additional steps of selecting the percentage of fibers in the elastic element and the desired orientation of the fibers in the elastic element to control the bending vibrations in the rotating shaft. The fiber orientation and content of the elastic element can be selected to adjust the second shear modulus of the elastic element in the second direction. The effectiveness of the vibration damper in controlling bending vibrations may be governed partially by the effective shear rate of the elastic element in the second direction.

Depending on the selected orientation of the fibers, the percentage of fibers in the elastic element may be increased to optimize the effective control of bending vibrations without substantially affecting the torsional damping frequency of the vibration damper. Accordingly, the torsional and bending frequencies of the vibration damper may be adjusted separately.

In another aspect, rather than tuning the damper to control a desired torsional frequency first as previously described, if the resonant bending frequency is known or determined experimentally, the damper may be tuned to control the desired bending frequency first. Specifically, the method may include the alternative steps of selecting the mass and geometry of the inertia element and selecting the first shear modulus of the elastic element to control bending vibrations in the rotating shaft. Once the bending vibrations are sufficiently damped, the percentage of fibers in the elastic element and the desired orientation of the fibers in the elastic element may be selected to control the torsional vibrations in the rotating shaft.

The order in which the torsional and bending vibrations are addressed is not critical to the method of construction. Ordinarily the vibration damper will be tuned to control the resonant torsional vibrations first because the frequency of the resonant torsional vibrations is more likely to be known. The bending vibrations can then be addressed through the careful inclusion of fibers within the elastic element without substantially altering the torsional damping frequency. Of course, because either the torsional or bending frequency can be altered by the careful inclusion of fibers without effecting the other, either the torsional or the bending vibrations can be addressed with the fiber, and in any order.

In addition to the embodiments described herein for use with a crankshaft, the disclosed vibration dampers may also be effective with other items utilizing elastomeric springs for isolation or damping, such as, but not limited to, elastomeric dual mass flywheels, elastomeric isolators and elastomeric tensioners.

What is claimed is:

1. A vibration damper for damping torsional and bending vibrations in a rotating shaft having an axis of rotation, the vibration damper comprising:
   a hub adapted to be coupled to the shaft for rotational movement therewith;
   an inertia element concentric with the hub; and
   an elastic element adapted to non-rigidly couple the hub and the inertia element;
   wherein the elastic element possesses a first shear modulus in a first direction and a second shear modulus in a second direction and wherein the first shear modulus and the second shear modulus are different.

2. The vibration damper of claim 1 wherein the elastic element comprises a composite material.

3. The vibration damper of claim 2 wherein the composite material comprises an elastomer having a plurality of fibers dispersed therein.

4. The vibration damper of claim 3 wherein the plurality of fibers are dispersed within the elastomer in a unidirectional orientation.

5. The vibration damper of claim 3 wherein the plurality of fibers are dispersed within the elastomer in a longitudinal orientation with respect to the elastic element.

6. The vibration damper of claim 3 wherein the plurality of fibers are dispersed within the elastomer in an axial orientation that is substantially parallel to the axis of rotation.

7. The vibration damper of claim 3 wherein the plurality of fibers are dispersed within the elastomer in a radial orientation with respect to the axis of rotation.

8. The vibration damper of claim 1 wherein a first surface located on the inertia element is spaced radially outwardly from a second surface located on the hub, and wherein the elastic element is located between the first surface and the second surface.

9. The vibration damper of claim 1 wherein an outer surface of the inertia element is adapted to receive a power-transmitting belt.

10. The vibration damper of claim 1 wherein an outer surface of the hub is adapted to receive a power-transmitting belt.

11. A vibration damper for damping torsional and bending vibrations in a rotating shaft having an axis of rotation, the vibration damper comprising:
    a hub adapted to be coupled to the shaft for rotational movement therewith;
    an inertia element concentric with the hub; and
    an anisotropic elastic element adapted to non-rigidly couple the hub and the inertia element, the anisotropic elastic element having a first shear modulus in a first direction and a second shear modulus in a second direction that is different from the first shear modulus.

* * * * *

UNITED STATES PATENT AND TRADEMARK OFFICE
CERTIFICATE OF CORRECTION

PATENT NO.      : 7,658,127 B2                                    Page 1 of 1
APPLICATION NO. : 10/802104
DATED           : February 9, 2010
INVENTOR(S)     : Robert J. Crist It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1202 days.

Signed and Sealed this

Twenty-eighth Day of December, 2010

David J. Kappos
*Director of the United States Patent and Trademark Office*